US006469298B1

(12) United States Patent
Ramsey et al.

(10) Patent No.: US 6,469,298 B1
(45) Date of Patent: Oct. 22, 2002

(54) MICROSCALE ION TRAP MASS SPECTROMETER

(75) Inventors: J. Michael Ramsey, Knoxville; William B. Witten, Lancing, both of TN (US); Oleg Kornienko, Lansdale, PA (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/398,702

(22) Filed: Sep. 20, 1999

(51) Int. Cl.[7] .......................... B01D 59/44; H01J 49/00
(52) U.S. Cl. ...................................... 250/292; 250/281
(58) Field of Search ................................ 250/292, 281

(56) References Cited

U.S. PATENT DOCUMENTS

| | | | | |
|---|---|---|---|---|
| 5,028,777 A | | 7/1991 | Franzen et al. | 250/282 |
| 5,248,883 A | | 9/1993 | Brewer et al. | 250/292 |
| 5,386,115 A | | 1/1995 | Freidhoff et al. | 250/281 |
| 6,087,658 A | * | 7/2000 | Kawato | 250/292 |

FOREIGN PATENT DOCUMENTS

| | | |
|---|---|---|
| EP | 0336990 | 10/1989 |
| EP | 0383961 | 8/1990 |

OTHER PUBLICATIONS

Jacobson, Stephen C. et al.; "Microfabricated Chemical Separation Devices;" 1998; *High Performance Capillary Electrophoresis*. Chemical Analysis Series, vol. 146, Chapter 18, pp. 613–633.

Terry, Stephen C. et al.; "A Gas Chromatographic Air Analyzer Fabricated on a Silicon Wafer;" 1979; *IEEE Transactions on Electron Devices*, vol. ED–26. No. 12, Dec. 1979, pp. 1880–1886.

Xue, Qifeng et al.; "Multichannel Microchip Electrospray Mass Spectrometry;" 1997; *Anal. Chem.* 1997, vol. 69, pp. 426–430.

Ramsey, R.S. et al.; "Generating Electrospray from Microchip Devices Using Electroosmotic Pumping;" 1997; *Anal. Chem.* 1997, vol. 69 pp. 1174–1178.

Desai, Amish, et al.; "A MEMS Electrospray Nozzle for Mass Spectroscopy;" 1997; *Transducers* '97; 1997 International Conference on Solid–State Sensors and Actuators, Chicago, Jun. 16–19, 1997, pp. 927–930.

Neuhauser, W., et al.; "Localized Visible Ba + Mono–ion Oscillator;" 1980; *Physical Review A*, vol. 22, No. 3, Sep. 1980, pp. 1137–1140.

Brewer, R.G. et al.; "Planar Ion Microtraps;" 1992; *Physical Review A*, vol. 46, No. 11, Dec. 1, 1992, pp. R6781–R6784.

Hartsung, W.H. et al.; "On the Electrodynamic Balance;" 1992; *Proc. R. Soc. Lond. A*, (1992) vol. 437, pp. 237–266.

(List continued on next page.)

*Primary Examiner*—Bruce Anderson
(74) *Attorney, Agent, or Firm*—Akerman, Senterfitt & Edison, P.A.

(57) ABSTRACT

An ion trap for mass spectrometric chemical analysis of ions is delineated. The ion trap includes a central electrode having an aperture; a pair of insulators, each having an aperture; a pair of end cap electrodes, each having an aperture; a first electronic signal source coupled to the central electrode; a second electronic signal source coupled to the end cap electrodes. The central electrode, insulators, and end cap electrodes are united in a sandwich construction where their respective apertures are coaxially aligned and symmetric about an axis to form a partially enclosed cavity having an effective radius $r_0$ and an effective length $2z_0$, wherein $r_0$ and/or $z_0$ are less than 1.0 mm, and a ratio $z_0/r_0$ is greater than 0.83.

10 Claims, 1 Drawing Sheet

OTHER PUBLICATIONS

Kaiser, Jr., Raymond E. et al.; "Operation of a Quadrupole Ion Trap Mass Spectrometer to Achieve High Mass/Charge Ratios;" 1991; *International Journal of Mass Spectrometry and Ion Processes*, vol. 106 (1991) pp. 79–115.

Badman, Ethan R. et al.; "A Miniature Cylindrical Quadrupole Ion Trap: Simulation and Experiment;" 1998; *Anal. Chem.*, vol. 70, No. 23, pp. 4896–4901.

Wang, Y. et al.; "Generation of an Exact Three–dimensional Quadrupole Electric Field and Superposition of a Homogeneous Electric Field within a Common Closed Boundary with Application to Mass Spectrometry;" 1993; *J. Chem. Phys.*, vol. 98, No. 4, Feb. 15, 1993, pp. 2647–2652.

Wells, J. Mitchell et al.; "A Quadrupole Ion Trap with Cylindrical Geometry Operated in the Mass–Selective Instability Mode;" 1998; *Analytical Chemistry*, vol. 70, No. 3, Feb. 1, 1998, pp. 438–444.

Badman, Ethan R. et al.; "Fourier Transform Detection in a Cylindrical Quadrupole Ion Trap;" 1998; *Analytical Chemistry*, vol. 70, No. 17, Sep. 1, 1998, pp. 3545–3547.

Kornienko, Oleg et al.; "Field–Emission Cold–Cathode El Source for a Microscale Ion Trap Mass Spectrometer;" *Analytical Chemistry*, 72:559–562, 2000.

Kornienko, Oleg et al.; "Electron Impact Inonization in a Microion Trap Mass Spectrometer;" 1999; *Review of Scientific Instruments*, vol. 70, No. 10, Oct. 1999, pp. 3907–3909.

Kornienko, Oleg, et al.; "Micro Ion Trap Mass Spectrometry;" *Rapid Communications in Mass Spectrometry*, 1999, vol. 13, pp. 50–53.

* cited by examiner

MICROSCALE ION TRAP MASS SPECTROMETER

STATEMENT REGARDING FEDERALLY SPONSORED RESEARCH OR DEVELOPMENT

This invention was made with government support under contract DE-AC05-96OR22464, awarded by the United States Department of Energy to Lockheed Martin Energy Research Corporation, and the United States Government has certain rights in this invention.

CROSS REFERENCE TO RELATED APPLICATIONS (Not Applicable)

BACKGROUND OF THE INVENTION

1. Technical Field

This invention relates to mass spectrometers, and more particularly to a submillimeter ion trap for mass spectrometric chemical analysis.

2. Description of the Related Art

Microfabricated devices for liquid-phase analysis have attracted much interest because of their ability to handle small quantities of sample and reagents, measurement speed and reproducibility, and the possibility of integration of several analytical operations on a monolithic substrate. Although the application of microfabricated devices to vapor-phase analysis was first demonstrated 20 years ago, further application of these devices has not been prolific due primarily to poor performance because of mass transfer issues. However, some low pressure analytical techniques, such as mass spectrometry, should be possible with microfabricated instrumentation. Recent reports of microfabricated electrospray ion sources for mass spectrometry make the possibility of miniature ion trap spectrometers especially attractive.

Ion traps of millimeter size and smaller have been used for storage and isolation of ions for optical spectroscopy, though not for mass spectrometry. The principal requirement for ion trap geometry is the presence of a quadrupole component of the radio frequency (RF) electric field. Conventional ion trap electrode constructions include hyperbolic electrodes, a sandwich of planar electrodes, and a single ring electrode. For more information concerning ion trap mass spectrometry, the three-volume treatise entitled: "Practical Aspects of Ion Trap Mass Spectrometry" by Raymond E. March et al. may be considered, and is incorporated herein by reference.

The smallest known quadrupole ion trap that has been evaluated for mass analysis or for isolation of ions of a narrow mass range was a hyperbolic trap with an $r_0$ value of 2.5 mm, as reported by R. E. Kaiser et al. in *Int. J. of Mass Spectrometry Ion Processes* 106, 79 (1997). One problem with this and other small-scale ion traps used in mass spectrometry is their limited spectral resolution. For instance, existing small-scale ion traps typically do not provide useful mass spectral resolution below 1.0–2.0 AMUs (atomic mass units). Moreover, there is a demand for even smaller ion traps, (i.e., submillimeter with $r_0$ and/or zvalues less than 1.0 mm), for use in mass spectrometry, though ion traps of this size exacerbate the present limitations in mass spectral resolution.

Thus, there was a need for a submillimeter ion trap with improved spectral resolution in performing mass spectrometry.

SUMMARY OF THE INVENTION

The present invention concerns a submillimeter ion trap for mass spectrometric chemical analysis. In the preferred embodiment, the ion trap is a submillimeter trap having a cavity with: 1) an effective length $2z_0$ with $z_0$ less than 1.0 mm; 2) an effective radius $r_0$ less than 1.0 mm; and 3) a $z_0/r_0$ ratio greater than 0.83. Testing demonstrates that a $z_0/r_0$ ratio in this range improves mass spectral resolution from a prior limit of approximately 1.0–2.0 AMUs, down to 0.2 AMUs, the result of which is a smaller ion trap with improved mass spectral resolution. Employing smaller ion traps without sacrificing mass spectral resolution opens a wide variety of new applications for mass spectrometric chemical analysis.

The ion trap comprises: a central electrode having an aperture; a pair of insulators, each having an aperture; a pair of end cap electrodes, each having an aperture; a first electronic signal source coupled to the central electrode; and a second electronic signal source coupled to the end cap electrodes. In the preferred embodiment, the central electrode, insulators, and end cap electrodes are united in a sandwich construction where their respective apertures are coaxially aligned and symmetric about an axis to form a partially enclosed cavity having an effective radius $r_0$ and an effective length $2z_0$. Moreover, $r_0$ and/or $z_0$ are less than 1.0 mm, and the ratio $z_0/r_0$ is greater than 0.83.

BRIEF DESCRIPTION OF THE DRAWINGS

There are presently shown in the drawings embodiments which are presently preferred, it being understood, however, that the invention is not limited to the precise arrangements and instrumentalities shown, wherein.

DETAILED DESCRIPTION OF THE INVENTION

Figure 1:
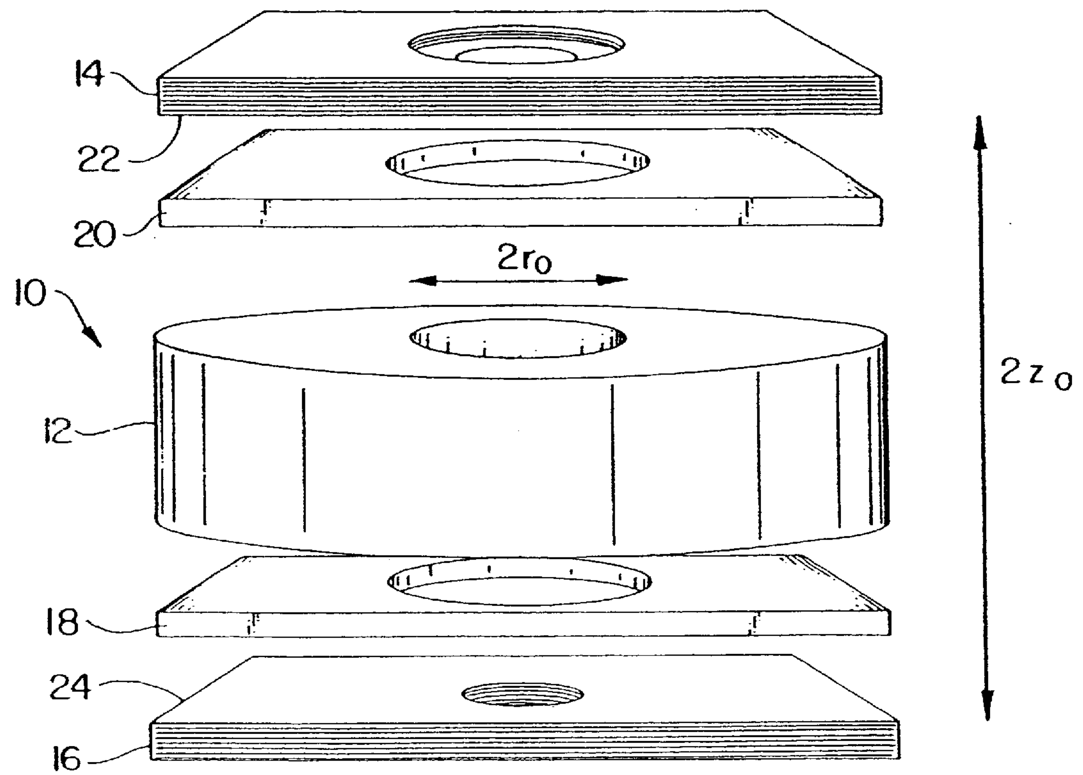
FIG. 1 is an exploded perspective view of an ion trap in accordance with the present invention.

FIG. 1 illustrates an ion trap 10 manufactured in accordance with the present invention. While ion trap 10 is shown as a cylindrical-type-geometry trap, the present invention may be incorporated into other known ion trap geometries.

A ring electrode 12 is formed by producing a centrally located hole of appropriate diameter in a stainless steel plate. Here, the hole's radius $r_0$ is 0.5 mm, so the diameter of the drilled hole in ring electrode 12 is 1.0 mm. The thickneess of ring electrode 12 is approximately 0.9 mm.

Planar end caps 14 and 16 comprise either stainless steel sheets or mesh. The end caps 14 and 16 include a centrally located recess of approximately 1.0 mm diameter, with the bottom surface of the recess having a hole of approximately 0.45 mm diameter. End caps 14 and 16 are separated from ring electrode 12 by insulators 18 and 20, each of which include a centrally located hole of 1.0 mm diameter. Insulators 18 and 20 may comprise Teflon tape with opposing adhesive surfaces.

The holes in the ring electrode 12, end caps 14 and 16, and insulators 18 and 20 are produced using conventional machining techniques. However, the holes could be formed using other methods such as wet chemical etching, plasma etching, or laser machining. Moreover, the conductive materials employed for ring electrode 12, and end caps 14 and 16 could be other than described above. For example, the conductive materials used could be various other metals, or doped semiconductor material. Similarly, Teflon tape need not necessarily be the material of choice for insulators 18 and 20. Insulators 18 and 20 could be formed of other plastics, ceramics, or glasses including thin films of such materials on the conductive materials.

The centrally located holes in ring electrode 12, end caps 14 and 16, and insulators 18 and 20 are preferably coaxially and symmetrically aligned about a vertical axis (not shown), to permit laser access and ion ejection. When assembled into a sandwich construction, the interior surfaces of ion trap 10 form a generally tubular shape, and bound a partially enclosed cavity with a corresponding cylindrical shape.

The distance between lower surface 22 of upper end cap 14 and upper surface 24 of lower end cap 16 is $2z_0$, where $z_0$ is 0.5 mm. As previously mentioned, $r_0$ is approximately 0.5 mm. Thus, the ratio $z_0/r_0$ is 1.0, which falls within a desired range which produces improved mass spectral resolution for ion trap 10 during mass spectrometry. A $z_0/r_0$ ratio range which is greater than 0.83 is desirable, as testing shows it provides mass spectral resolution down to 0.2 AMUs, achieving a significant improvement over the art.

In the preferred embodiment, ion trap 10 is a submillimeter trap having a cavity with: 1) an effective length $2z_0$ with $z_0$ less than 1.0 mm; 2) an effective radius $r_0$ less than 1.0 mm; and 3) a $z_0/r_0$ ratio greater than 0.83. However, those with skill in the art will appreciate that a $z_0$ and/or an $r_0$ greater than or equal to 1.0 mm could be employed while maintaining a $z_0/r_0$ ratio greater than 0.83. Similarly, those with skill in the art appreciate that various other changes may be made to ion trap 10, such as substituting different conductive materials for ring electrode 12 and end caps 14 and 16. Additionally, the cavity in ion trap 10 need not necessarily be centrally located.

Figure 2:
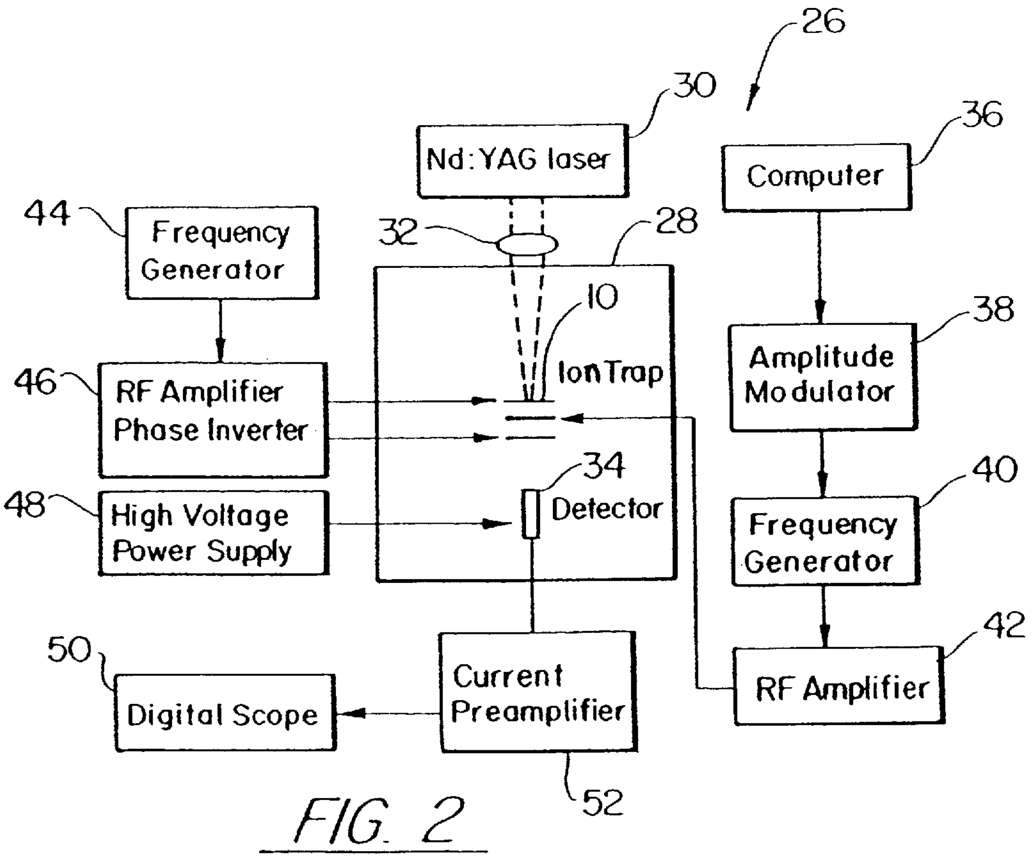
FIG. 2 is system view employing the ion trap of FIG. 1 to perform mass spectrometric chemical analysis.

FIG. 2 illustrates a system 26, which includes ion trap 10, for performing mass spectrometry. Ion trap 10 is conventionally mounted in a vacuum chamber 28 with a Channeltron electron multiplier detector 34, manufactured by the Galileo Corp. of Sturbridge, Mass. Detector 34 is located near the central axis of ion trap 10 to detect the generated ions. A Nd:YAG laser source 30 produces a pulsed 266-nm harmonic (~1 mJ/pulse, ~5 ns duration, 10 Hz repetition rate) beam focussed by a 250 mm lens 32 through a window in vacuum chamber 28 to generate ions within ion trap 10. Laser source 30 is a DCR laser made by Quanta Ray Corp. of Mountain View, Calif. A beam stop (not shown) made from copper tubing is placed near detector 34 to intercept laser light emerging from ion trap 10 to minimize ion generation and photoelectron emission external to trap 10 itself. Helium buffer gas at nominally $10^{-3}$ Torr and a sample vapor may be introduced into the vacuum chamber 28 through needle valves (not shown). Ion trap 10 is operated in the mass-selective instability mode, with or without a supplementary dipole field for resonant enhancement of the ejection process.

To provide the radio frequency (RF) signal for ring electrode 12, a conventional computer 36 provides control signals to amplitude modulator 38, a DC345 device manufactured by Stanford Research Systems of Sunnyvale, Calif. A conventional frequency generator 40, implemented with a DC345 device manufactured by Stanford Research Systems, receives signals from amplitude modulator 38, and outputs the desired trapping voltage and ramp for mass scanning. The output signal from frequency generator 40 is then amplified by a 150 W power amplifier 42, the 150A100A amplifier manufactured by Amplifier Research of Souderton, Pa., and is applied to ring electrode 12.

When axial modulation is desired, a supplementary voltage from frequency generator 44, a DC345 device manufactured by Stanford Research Systems, may be applied to end caps 14 and 16. The output of frequency generator 44 is delivered to a conventional RF amplifier phase inverter 46 before delivery to end caps 14 and 16. Alternatively, end caps 14 and 16 are grounded. The Channeltron detector's bias voltage, up to 1700 V, is supplied by DC power supply 48, the BHK-2000-0 1MG manufactured by Kepco Corp. of Flushing, N.Y. DC power supply 48 may be programmed so that the detector's bias voltage is reduced during the laser pulse to avoid detector preamplifier overload.

The output from detector 34 is amplified by current-to-voltage preamplifier 52, an SR570 manufactured by Stanford Research Systems, with a gain of 50–200 nA $V^{-1}$ and stored on digital oscilloscope 50, a TDS 420A manufactured by Tektronix Corp. of Wilsonville, Oreg.

The ion trap 10 described above was machined using conventional materials and methods, and may be produced with any suitable material and method of manufacture. Moreover, those skilled in the art understand that ion trap 10 may be manufactured into versions that could be integrated with other microscale instrumentation.

As described above, ions are generated with ion trap 10 by employing a laser ionization source 30; however, in an alternative embodiment, electron impact (EI) ionization may be employed. An El source can generate ions from atomic or molecular species that are difficult to ionize with laser pulses.

When employing an EI source, it is preferably located within the vacuum chamber 28, which houses ion trap 10. This permits the EI source, ion trap 10, and detector 34 to be self-contained, and therefore, much smaller in overall size than when the external pulsed laser 30 is used. Employing this self-contained arrangement minimizes mass spectrometer size. The size of the ion trap 10 and the associated sampling and detecting components are compatible with micromachining capabilities.

Moreover, those skilled in the art appreciate that any ion production method that works with a laboratory instrument could be used with ion trap 10. For example, electrospray ionization or matrix-assisted laser desorption/ionization (MALDI) could be used most notably for large molecules such as biomolecules. Chemical ionization and other forms of charge exchange are also suitable methods of sample ionization.

Additionally, the interior surface of ion trap 10 has been described as having a generally tubular shape, and bounding a partially enclosed cavity with a corresponding cylindrical shape. However, those skilled in the art understand that other conventional ion trap geometries could be employed while maintaining a submillimeter ion trap, as described, namely one having a $z_0/r_0$ ratio greater than 0.83. In instances where other than cylindrical geometry is employed for ion trap 10, an average effective $r_0$ could be used for $z_0/r_0$ determination. Similarly, for various other ion trap geometries, an average effective length $2z_0$ could be employed for ratio determination.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

We claim:

1. An ion trap mass spectrometer for chemical analysis, comprising:

a) a central electrode having an aperture;

b) a pair of insulators, each having an aperture;

c) a pair of end cap electrodes, each having an aperture;

d) a first electronic signal source coupled to the central electrode; and e) a second electronic signal source coupled to the end cap electrodes;

f) said central electrode, insulators, and end cap electrodes being united in a sandwich construction where their respective apertures are coaxially aligned and symmetric about an axis to form a partially enclosed cavity having an effective radius $r_0$ and an effective length $2z_0$, wherein at least one of $r_0$ and $z_0$ are less than 1.0 mm, and a ratio $z_0/r_0$ is greater than 0.83.

2. The ion trap of claim 1 wherein the central electrode is annular.

3. The ion trap of claim 1 wherein the cavity is cylindrical in shape.

4. The ion trap of claim 1 wherein the effective length $2z_0$ comprises the distance between opposing interior surfaces of the end cap electrodes.

5. The ion trap of claim 1 wherein $r_0$ and $z_0$ are both less than 1.0 mm.

6. The ion trap of claim 1 wherein the ionization source comprises a laser beam source.

7. The ion trap of claim 1 wherein the ionization source comprises an electron impact (EI) ionization source.

8. The ion trap of claim 1 wherein the central electrode is manufactured using a doped semiconductor material.

9. The ion trap of claim 1 wherein the end cap electrodes are manufactured using a doped semiconductor material.

10. The ion trap of claim 1 wherein the insulators are manufactured using a film of one of a plastic, a ceramic, and a glass.

* * * * *

UNITED STATES PATENT AND TRADEMARK OFFICE

CERTIFICATE OF CORRECTION

PATENT NO. : 6,469,298 B1
APPLICATION NO. : 09/398702
DATED : October 22, 2002
INVENTOR(S) : J. Michael Ramsey, William B. Whitten and Oleg Kornienko It is certified that error appears in the above-identified patent and that said Letters Patent is hereby corrected as shown below:

On the Title page, Item (75) Inventors, the spelling for Inventor "William. B. Witten" should read --William B. Whitten--

Signed and Sealed this
Twelfth Day of February, 2013

Teresa Stanek Rea
*Acting Director of the United States Patent and Trademark Office*